C. DAHER.
PROCESS OF MANUFACTURING CEMENT.
APPLICATION FILED MAY 5, 1909.
1,004,380.
Patented Sept. 26, 1911.
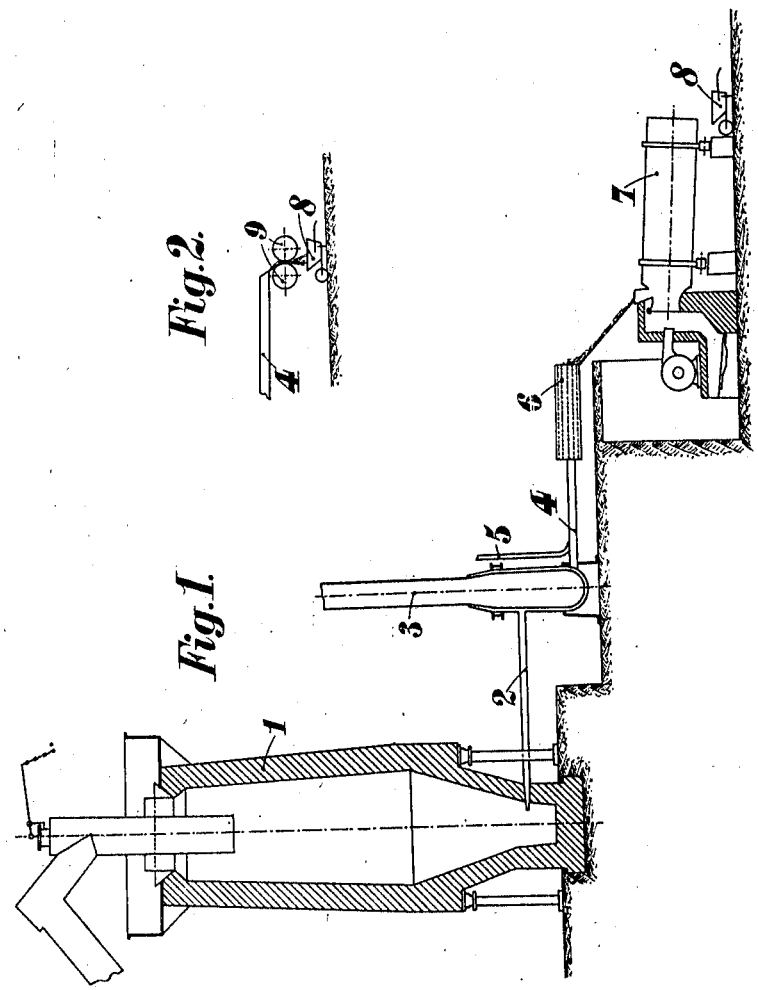

UNITED STATES PATENT OFFICE.

CHARLES DAHER, OF MARSEILLE, FRANCE, ASSIGNOR TO THE SOCIETE J. ET A. PAVIN DE LAFARGE, OF VIVIERS, FRANCE, A CORPORATION OF FRANCE.

PROCESS OF MANUFACTURING CEMENT.

1,004,380.     Specification of Letters Patent.     Patented Sept. 26, 1911.

Application filed May 5, 1909. Serial No. 494,106.

*To all whom it may concern:*

Be it known that I, CHARLES DAHER, a citizen of the French Republic, residing at Marseille, Department of the Bouches du Rhône, in France, have invented certain new and useful Improvements in Processes of Manufacturing Cement; and I do hereby declare the following to be a full, clear, and exact description of the invention, such as will enable others skilled in the art to which it appertains to make and use the same.

The invention has for its object a process for the manufacture of cement consisting in utilizing the slag delivered from blast furnaces at the moment at which it leaves the furnaces. In order to bring this slag into a sufficiently hydraulic condition, it must be of a composition corresponding approximately with the formula:

$$SiO_2 2CaO + Al_2O_3 CaO.$$

This result is obtained by the addition of a certain quantity of lime but in order to preserve a sufficiently hydraulic slag it is also necessary to add a certain quantity of aluminous material, such as bauxite or iron ore. It is then only necessary to run off the product thus obtained and to granulate it rapidly in order to obtain a first class cement.

In the accompanying drawings: Figure 1 shows schematically an apparatus adapted for use in carrying out the invention. Fig. 2 shows a modified detail.

1 represents (Fig. 1) the blast furnace in which the slag is formed. At the lower part of the blast furnace 1, the slag is collected in a conduit 2 and conducted to a furnace 3 which may be of any convenient type and wherein the lime, alumina and iron which are required in order to obtain the chemical composition of the slag are added. All the materials enter this furnace in the state of fusion; they are then run into a granulation conduit 4. The front part of this conduit is provided with a pipe 5 through which a very powerful water jet is admitted.

Behind the conduit 4 a rotary drum 6 is arranged for eliminating the water. On leaving this drum the slag falls into a rotary drier 7 which is heated, preferably in utilizing the waste heat. On leaving the drier 7 the slag is collected in a tank 8 and should be reduced by trituration to a finely powdered condition like ordinary cement.

The installation described above (apparatus 4, 5, 6, 7) may be replaced by a cylinder granulator represented schematically in 9 Fig. 2, and cooled by a water current.

I claim:

1. A process for manufacturing cement, which comprises producing a quantity of fluid slag in a blast furnace, mixing such slag while still fluid with lime and aluminous material in order to produce a mixture corresponding approximately to $$SiO_2 2CaO + Al_2O_3 CaO,$$

and then granulating and drying the mixture so formed.

2. A process for manufacturing cement, which comprises producing a quantity of fluid slag in a blast furnace, mixing such slag while still fluid with lime and aluminous material in order to produce a mixture corresponding approximately to $$SiO_2 2CaO + Al_2O_3 CaO,$$

and then granulating and drying the mixture so formed, the materials combined with the slag being mixed therewith while in a state of fusion.

In testimony whereof I affix my signature, in presence of two witnesses.

CHARLES DAHER.

Witnesses:
   YOUSSOUF. FRIZ,
   PAUL DAHER.